US 6,718,633 B1

(12) United States Patent
Glenn et al.

(10) Patent No.: US 6,718,633 B1
(45) Date of Patent: Apr. 13, 2004

(54) PROCESS FOR MANUFACTURING VALVE TRIM ASSEMBLIES

(75) Inventors: Alan Holton Glenn, Salem, UT (US); Kenneth Alden Thurston, Salem, UT (US)

(73) Assignee: Flowserve Management Company, Irving, TX (US)

( * ) Notice: Subject to any disclaimer, the term of this patent is extended or adjusted under 35 U.S.C. 154(b) by 0 days.

(21) Appl. No.: 10/389,225

(22) Filed: Mar. 14, 2003

(51) Int. Cl.$^7$ .............................................. B23P 15/00
(52) U.S. Cl. ............................. 29/890.124; 29/890.12; 29/890.132; 138/42; 137/625.3
(58) Field of Search ...................... 29/890.12, 890.124, 29/890.126, 890.129, 890.128, 890.13, 890.132, 557, 558, 428; 138/42, 40; 137/625.3, 625.33; 251/127

(56) References Cited

U.S. PATENT DOCUMENTS

| | | | | |
|---|---|---|---|---|
| 4,018,245 A | * | 4/1977 | Baumann | 137/270 |
| 4,050,479 A | * | 9/1977 | Baumann | 138/42 |
| 4,060,099 A | * | 11/1977 | Bates, Jr. | 137/625.3 |
| 4,068,683 A | * | 1/1978 | Self | 137/625.3 |
| RE29,714 E | * | 8/1978 | Hayner et al. | 138/42 |
| 4,105,048 A | * | 8/1978 | Self | 138/42 |
| 4,125,129 A | * | 11/1978 | Baumann | 137/625.3 |
| 4,127,146 A | * | 11/1978 | Self | 137/625.3 |
| 4,185,664 A | * | 1/1980 | Zabsky et al. | 138/40 |
| 4,267,045 A | * | 5/1981 | Hoof | 210/322 |
| 4,279,274 A | * | 7/1981 | Seger | 138/42 |
| RE31,105 E | * | 12/1982 | Bates, Jr. | 137/625.3 |
| RE32,197 E | * | 7/1986 | Self | 251/127 |
| 5,390,896 A | * | 2/1995 | Smirl | 251/127 |
| 5,687,763 A | * | 11/1997 | Steinke | 137/625.33 |
| 5,732,687 A | * | 3/1998 | Hashimoto et al. | 123/520 |
| 5,769,122 A | * | 6/1998 | Baumann et al. | 137/625.33 |
| 5,772,178 A | * | 6/1998 | Bey | 251/127 |
| 5,803,119 A | * | 9/1998 | Steinke | 137/625.37 |
| 5,819,803 A | * | 10/1998 | Lebo et al. | 138/42 |
| 5,941,281 A | * | 8/1999 | Baumann et al. | 137/625.33 |
| 6,026,859 A | * | 2/2000 | Wears et al. | 137/625.33 |
| 6,039,076 A | * | 3/2000 | Hemme et al. | 137/625.37 |
| 6,095,196 A | * | 8/2000 | McCarty et al. | 138/42 |
| RE36,984 E | * | 12/2000 | Steinke | 137/625.33 |
| 6,244,297 B1 | * | 6/2001 | Baumann | 137/625.3 |

* cited by examiner

Primary Examiner—I Cuda Rosenbaum
(74) Attorney, Agent, or Firm—Dinsmore & Shohl LLP

(57) ABSTRACT

A process for manufacturing a valve trim assembly. The process comprises providing a flow disk having an outer diameter, an inner diameter, and an outer disposable flow disk portion, providing a separation disk having an outer diameter and an inner diameter, wherein the flow disk outer diameter is greater than the separation disk outer diameter, stacking the flow disk on the separation disk, and removing the outer disposable flow disk portion creating a reduced flow disk outer diameter. It is emphasized that this abstract is provided to comply with the rules requiring an abstract, which will allow a searcher or other reader to quickly ascertain the subject matter of the technical disclosure. It is submitted with the understanding that it will not be used to interpret or limit the scope or meaning of the claims. 37 C.F.R. §1.72(b).

25 Claims, 10 Drawing Sheets

PROCESS FOR MANUFACTURING VALVE TRIM ASSEMBLIES

BACKGROUND OF THE INVENTION

The present invention relates to fluid flow control and, more particularly, to a process for manufacturing a valve trim assembly.

Industries employing fluids such as liquids and gasses in a variety of applications often utilize fluid flow control valve systems to convert high-pressure fluids to low-pressure fluids. To accomplish this, a valve trim assembly is incorporated within a fluid flow control valve. The valve trim assembly dissipates the energy accompanying high-pressure fluids by reducing the pressure and velocity of the fluid. To attain this loss of energy, the high-pressure fluid is channeled through a plurality of passageways that are fashioned within a disk stack that defines the valve trim assembly. These passageways can embody a variety of configurations and create a tortuous path in which the high-pressure fluids must follow.

Typically in the prior art, the stack of valve trim disks that define the valve trim assembly begin with a bottom disk, upon which is stacked, in succession, a flow passage disk, an inlet/outlet disk, a separation disk, and another flow passage disk, etc. The manufacturing costs associated with combining all of the features of a flow passage disk, an inlet/outlet disk, and a separation disk into fewer than three separate disks are great. Consequently, the present inventors have recognized a need for improvements in processes for manufacturing valve trim assemblies.

SUMMARY OF THE INVENTION

The present invention meets the above-mentioned need by providing an improved process for economically manufacturing a valve trim assembly that incorporates all of the features of a three or more valve trim disk stack into a two disk design. Although the present invention is not limited to specific advantages or functionality, it is noted that valve trim assemblies can be manufactured with combination flow passage/inlet/outlet disks, which are referred to herein as "flow disks", comprising a plurality of outlet passages by stacking a flow disk on a separation disk and removing an outer disposable flow disk portion. In one embodiment of the present invention, the outlet passages formed within the flow disk, which can be tapered to comprise frequency shifting passages, can be in fluid communication with a tortuous flow path or an acoustic chamber fashioned within the same respective flow disk. The manufacturing method of the present invention significantly reduces manufacturing costs and streamlines processing of valve trim assemblies for fluid flow control valve systems.

In accordance with one embodiment of the present invention, a process for manufacturing a valve trim assembly is provided comprising providing a flow disk having an outer diameter, an inner diameter, and an outer disposable flow disk portion, providing a separation disk having an outer diameter and an inner diameter, wherein the flow disk outer diameter is greater than the separation disk outer diameter, stacking the flow disk on the separation disk, and removing the outer disposable flow disk portion creating a reduced flow disk outer diameter.

In accordance with another embodiment of the present invention, a process for manufacturing a valve trim assembly is provided comprising providing a flow disk having an outer diameter, an inner diameter, an outer disposable flow disk portion, and a plurality of outlet passages. Each outlet passage has a terminal end that does not extend to the flow disk outer diameter. The process further comprises providing a separation disk having an outer diameter and an inner diameter, stacking the flow disk on the separation disk, securing the flow disk to the separation disk, removing the outer disposable flow disk portion at least as far as the terminal end of the outlet passages creating a reduced flow disk outer diameter that transects the outlet passages, thereby creating a flow disk island between adjacent outlet passages, and stacking an additional disk adjacent to the flow disk to form the valve trim assembly. The flow disk outer diameter is greater than the separation disk outer diameter and the flow disk inner diameter is greater than or equal to the separation disk inner diameter. The additional disk is selected from a separation disk, a top disk, and a bottom disk.

In accordance with still another embodiment of the present invention, a process for manufacturing a valve trim assembly is provided comprising providing a flow disk having an outer diameter, an inner diameter, an outer disposable flow disk portion, an inner disposable flow disk portion, and a plurality of outlet passages. Each outlet passage has a terminal end that does not extend to the flow disk outer diameter. The process further comprises providing a separation disk having an outer diameter and an inner diameter, stacking the flow disk on the separation disk, securing the flow disk to the separation disk, removing the outer disposable flow disk portion at least as far as the terminal end of the outlet passages creating a reduced flow disk outer diameter that transects the outlet passages, thereby creating a flow disk island between adjacent outlet passages, removing the inner disposable flow disk portion creating a reduced flow disk inner diameter that is less than or equal to the separation disk inner diameter, and stacking an additional disk adjacent to the flow disk to form the valve trim assembly. The flow disk outer diameter is greater than the separation disk outer diameter and the flow disk inner diameter is less than the separation disk inner diameter. The additional disk is selected from a separation disk, a top disk, and a bottom disk.

In accordance with yet another embodiment of the present invention, a process for manufacturing a valve trim assembly is provided comprising providing a flow disk having an outer diameter, an inner diameter, an outer disposable flow disk portion, and a plurality of outlet passages. Each outlet passage has a terminal end that does not extend to the flow disk outer diameter. The outlet passages are in fluid communication with an acoustic chamber. The process further comprises providing a separation disk having an outer diameter and an inner diameter, stacking the flow disk on the separation disk, securing the flow disk to the separation disk, removing the outer disposable flow disk portion at least as far as the terminal end of the outlet passages creating a reduced flow disk outer diameter that transects the outlet passages, thereby creating a flow disk island between adjacent outlet passages, and stacking an additional disk adjacent to the flow disk to form the valve trim assembly. The flow disk outer diameter is greater than the separation disk outer diameter and the flow disk inner diameter is greater than or equal to the separation disk inner diameter. The additional disk is selected from a separation disk, a top disk, and a bottom disk.

In accordance with yet still another embodiment of the present invention, a process for manufacturing a valve trim assembly is provided comprising providing a flow disk having an outer diameter, an inner diameter, an outer disposable flow disk portion, an inner disposable flow disk portion, and a plurality of outlet passages. Each outlet passage has a terminal end that does not extend to the flow disk outer diameter. The outlet passages are in fluid communication with an acoustic chamber. The process further comprises providing a separation disk having an outer diameter and an inner diameter, stacking the flow disk on the separation disk, securing the flow disk to the separation disk, removing the outer disposable flow disk portion at least as far as the terminal end of the outlet passages creating a reduced flow disk outer diameter that transects the outlet passages, thereby creating a flow disk island between adjacent outlet passages, removing the inner disposable flow disk portion creating a reduced flow disk inner diameter that is less than or equal to the separation disk inner diameter, and stacking an additional disk adjacent to the flow disk to form the valve trim assembly. The flow disk outer diameter is greater than the separation disk outer diameter and the flow disk inner diameter is less than the separation disk inner diameter. The additional disk is selected from a separation disk, a top disk, and a bottom disk.

These and other features and advantages of the invention will be more fully understood from the following description of the several embodiments of the invention taken together with the accompanying drawings. It is noted that the scope of the claims is defined by the recitations therein and not by the specific discussion of features and advantages set forth in the present description.

BRIEF DESCRIPTION OF THE DRAWINGS

The following detailed description of the embodiments of the present invention can be best understood when read in conjunction with the following drawings, where like structure is indicated with like reference numerals and in which.

Skilled artisans appreciate that elements in the figures are illustrated for simplicity and clarity and have not necessarily been drawn to scale. For example, the dimensions of some of the elements in the figures may be exaggerated relative to other elements to help improve understanding of embodiments of the present invention.

DETAILED DESCRIPTION OF THE EMBODIMENTS OF THE INVENTION

Figure 1:
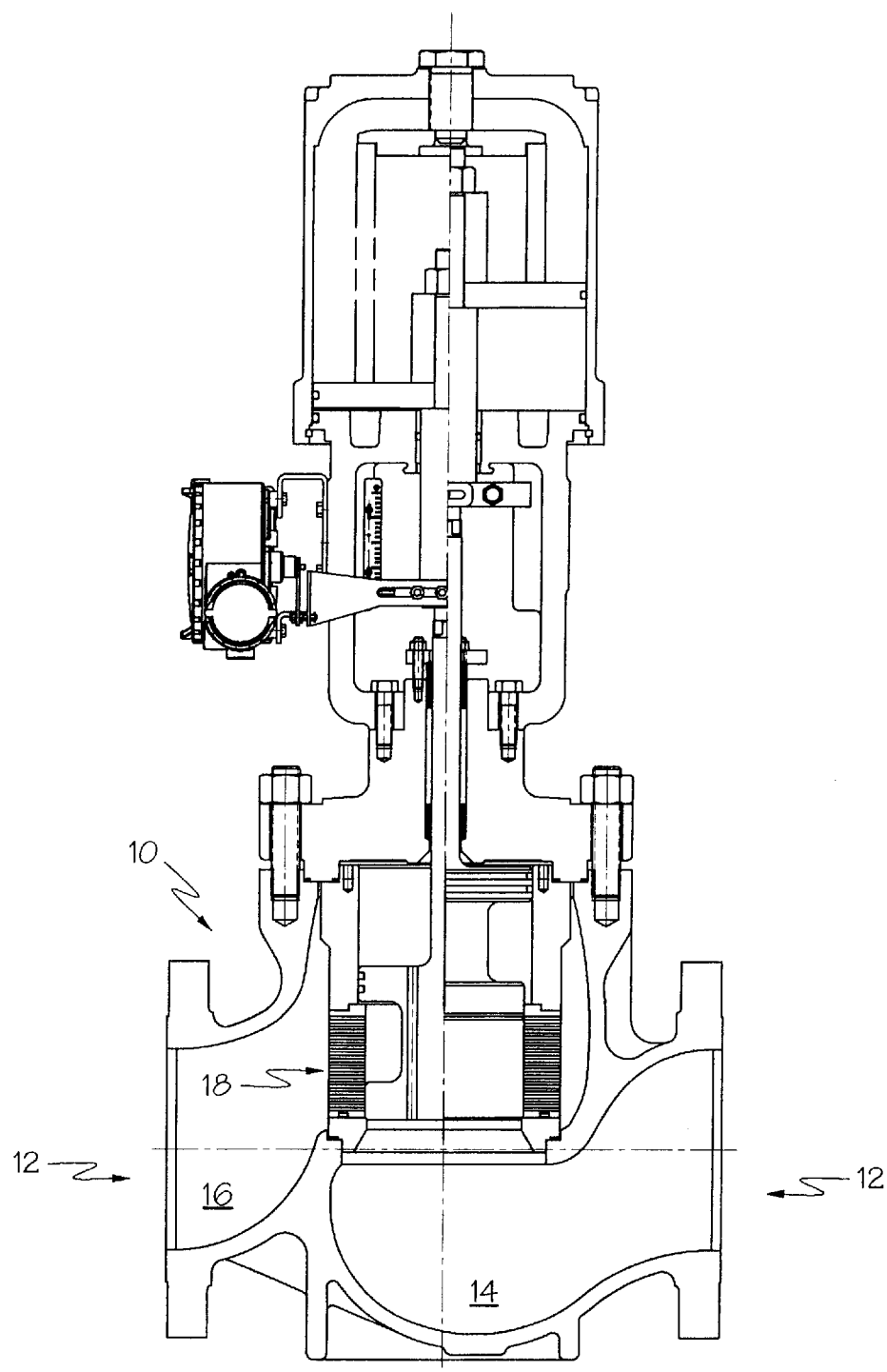
FIG. 1 illustrates a fluid flow control device or fluid valve including a valve trim assembly manufactured by the process of the present invention.

The general structure of a high-pressure fluid flow control device or valve system 10 is illustrated in FIG. 1. Referring collectively to FIGS. 1–9, the fluid flow control device 10 includes a valve trim assembly 18 comprising a plurality of annular valve trim disks 20A–20C, which can define a plurality of tortuous flow paths 30 along a fluid passage 12 between a fluid inlet 14 and a fluid outlet 16 of the fluid flow control device 10. Typically, the fluid inlets 14 are positioned along the inner diameter of the valve trim assembly 18. However, the system 10 can be designed to function with flow in the opposite direction or even bi-directionally, wherein the fluid inlets 14 and fluid outlets 16 are reversible in accordance with a particular application, such as, for example, use of the system 10 with a storage tank, wherein fluids travel both into and out of the system 10. The respective flow paths 30 defined by the valve trim disks 20A–20C can comprise an expansion/contraction mechanism 40, a velocity control mechanism 50, an acoustic chamber 60, and frequency shifting passages 70. It is noted that the present invention enjoys applicability to a variety of fluid flow control device designs and that the valve system 10 of FIG. 1 is presented for illustrative purposes only.

The plurality of valve trim disks 20A–20C typically include a flow disk 20A and a separation disk 20B, which are arranged adjacent to one another in a series or stack of a plurality of sets of adjacent disks. Respective top and bottom disks 20C define the top and bottom of a stack of disks, which comprise the valve trim assembly 18. For example, the valve trim assembly 18 manufactured by the process of the present invention can begin with the bottom disk 20C, upon which is stacked, in succession, a flow disk 20A, a separation disk 20B, another flow disk 20A, etc. The top of the disk stack that comprises the valve trim assembly 18 can be capped by a top disk 20C, the structure of which may be identical in cross section to the bottom disk 20C. The number and dimensions of the adjacent disks depend upon the design and operating parameters of the fluid flow control device 10. Although not intending to limit the disks of the present invention to any particular size, the adjacent disks can define an outer diameter of, such as, for example, about 3" (7.5 cm), an inner diameter of, such as, for example, about 1.5" (3.8 cm), and thicknesses of, such as, for example, about 0.06" for the flow disk 20A, about 0.015" for the separation disk 20B, about 0.125" for the bottom disk 20C, and about 0.45" for the top disk 20C. Accordingly, the top and bottom disks 20C are typically thicker than the flow disk 20A and the separation disk 20B.

In accordance with the present invention, a process for manufacturing a valve trim assembly is provided comprising providing the flow disk 20A having an outer diameter 21, an inner diameter 25, and an outer disposable flow disk portion 23, providing the separation disk 20B having an outer diameter 22 and an inner diameter 26, stacking the flow disk 20A on the separation disk 20B, and removing the outer disposable flow disk portion 23 creating a reduced flow disk outer diameter 24. Prior to removing the outer disposable flow disk portion 23 the flow disk 20A can be secured to the separation disk 20B by an operation selected from brazing, gluing, clamping, and combinations thereof. The outer disposable flow disk portion 23 can be removed by an operation selected from machining, laser cutting, and combinations thereof. Moreover, the process can further comprise stacking an additional disk adjacent to the flow disk 20A to form the valve trim assembly 18 of the present invention. The additional disk can be selected from the separation disk 20B, the top disk 20C, and the bottom disk 20C (see FIGS. 3 and 4). The additional disk can be secured to the flow disk 20A by an operation selected from brazing, gluing, clamping, and combinations thereof.

FIGS. 5a–5b and 6a–6b illustrate the manner in which the flow disk 20A and the separation disk 20B are stacked prior to removing the outer disposable flow disk portion 23 of the flow disk 20A. As shown in greater detail in the cutout of FIG. 5b as well as FIGS. 6a–6b, the flow disk outer diameter 21 is greater than the separation disk outer diameter 22. In addition, the flow disk 20A can comprise a plurality of outlet passages, each having a terminal end 72 (see FIG. 5b). Prior to removing the outer disposable flow disk portion 23 of the flow disk 20A, the terminal end 72 of each outlet passage does not extend to the flow disk outer diameter 21. At this point, however, the terminal end 72 can extend past the reduced flow disk outer diameter 24.

As further illustrated in FIGS. 7a–7b and 8a–8b, after removing the outer disposable flow disk portion 23 at least as far as the terminal end 72 of the outlet passages, the reduced flow disk outer diameter 24 is at least equal to the separation disk outer diameter 22. At this point, the reduced flow disk outer diameter 24 will transect the outlet passages. A flow disk island 35 is thereby created between adjacent outlet passages, which is secured to the separation disk 20B.

Figure 2:
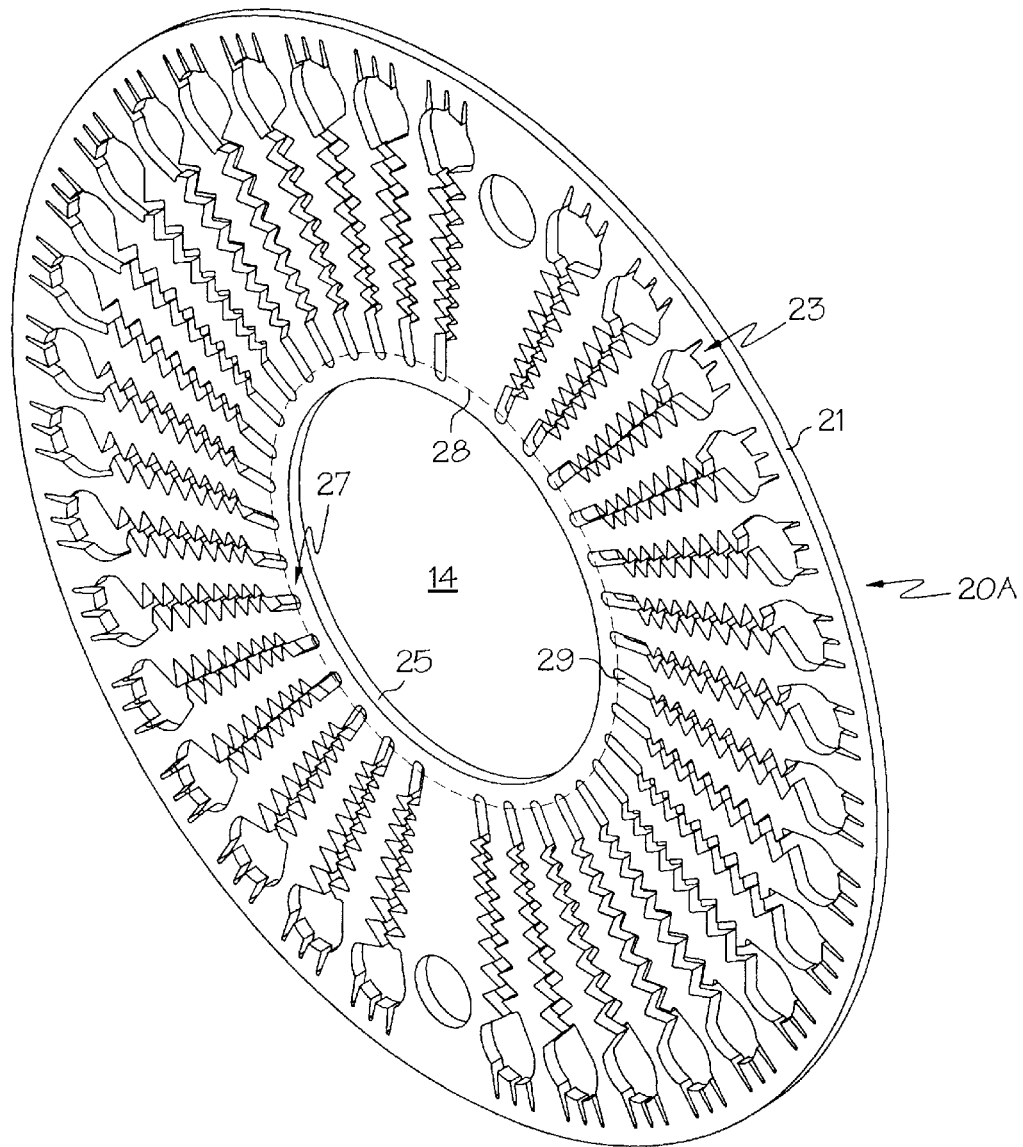
FIG. 2 illustrates a flow disk prior to removing an outer disposable flow disk portion in accordance with the process of the present invention for manufacturing a valve trim assembly.
Figure 3:
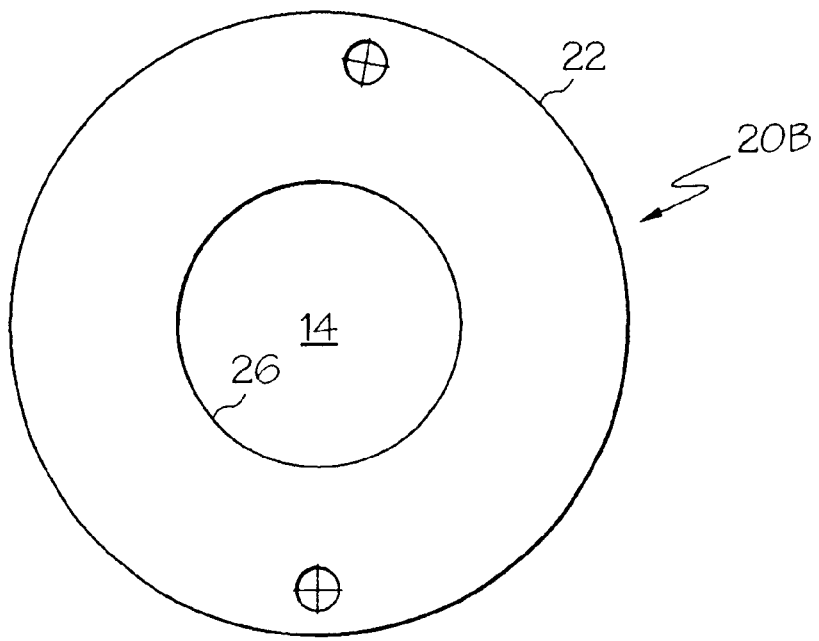
FIG. 3 illustrates a separation disk for a valve trim assembly manufactured by the process of the present invention.
Figure 4:
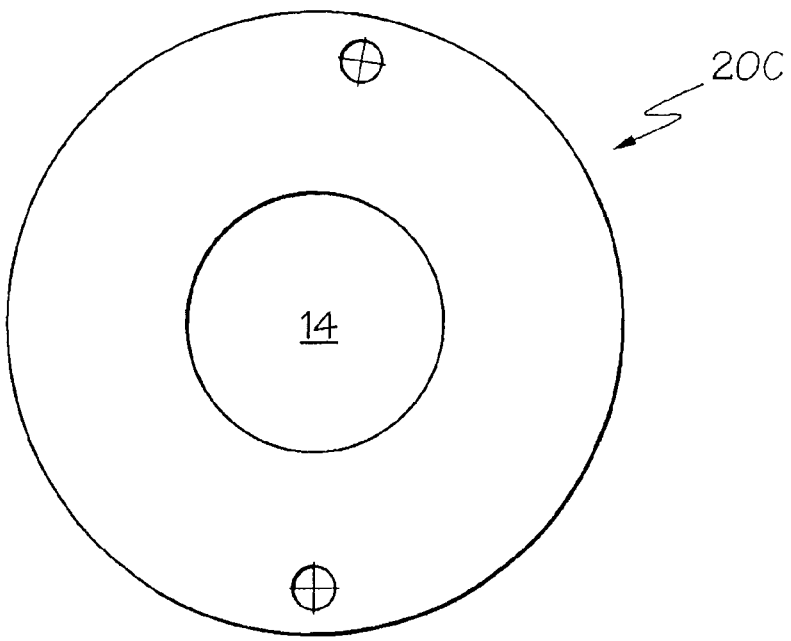
FIG. 4 illustrates a top or bottom disk for a valve trim assembly manufactured by the process of the present invention.
Figure 5A:
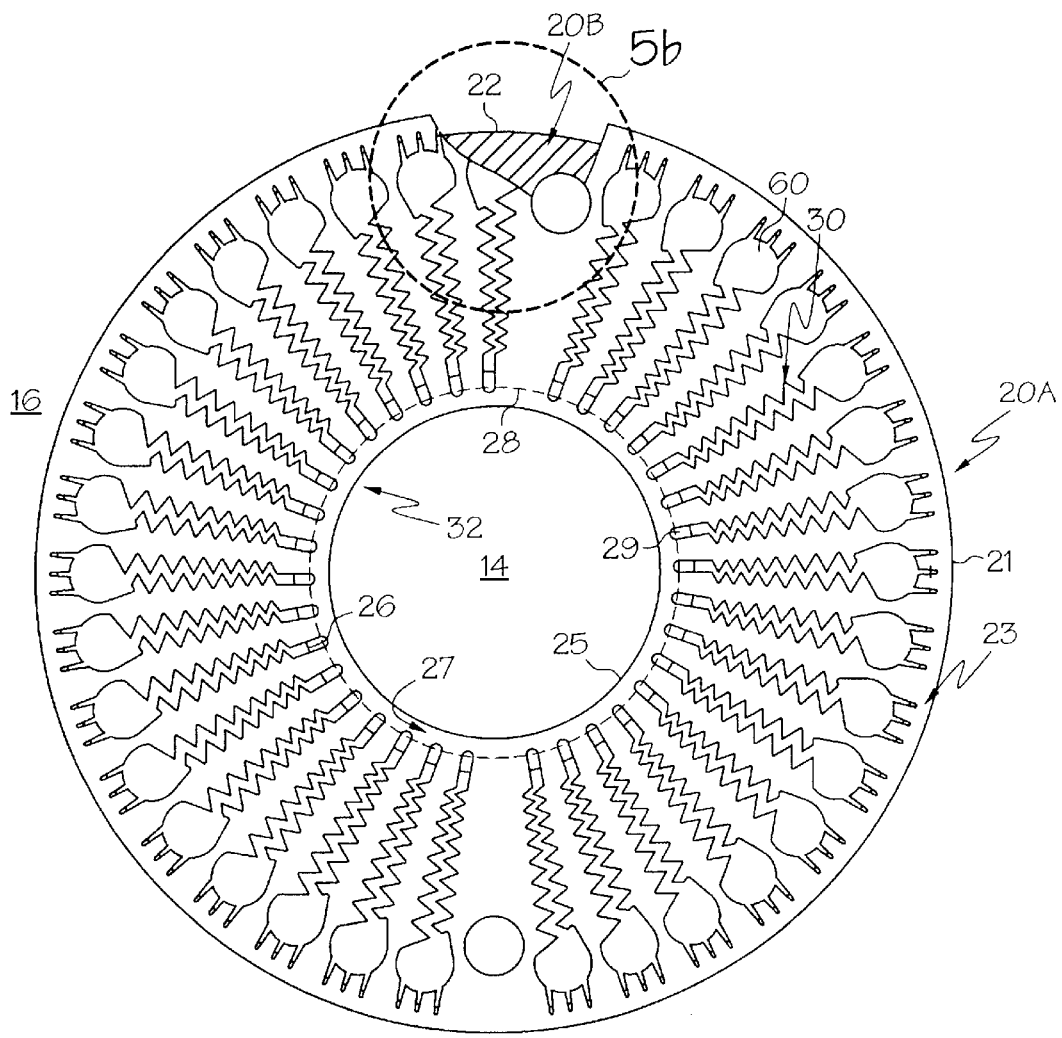
FIG. 5a illustrates a top view, partially broken away, of a flow disk stacked on a separation disk prior to removing an outer and an inner disposable flow disk portion in accordance with the process of the present invention for manufacturing a valve trim assembly.
Figure 7A:
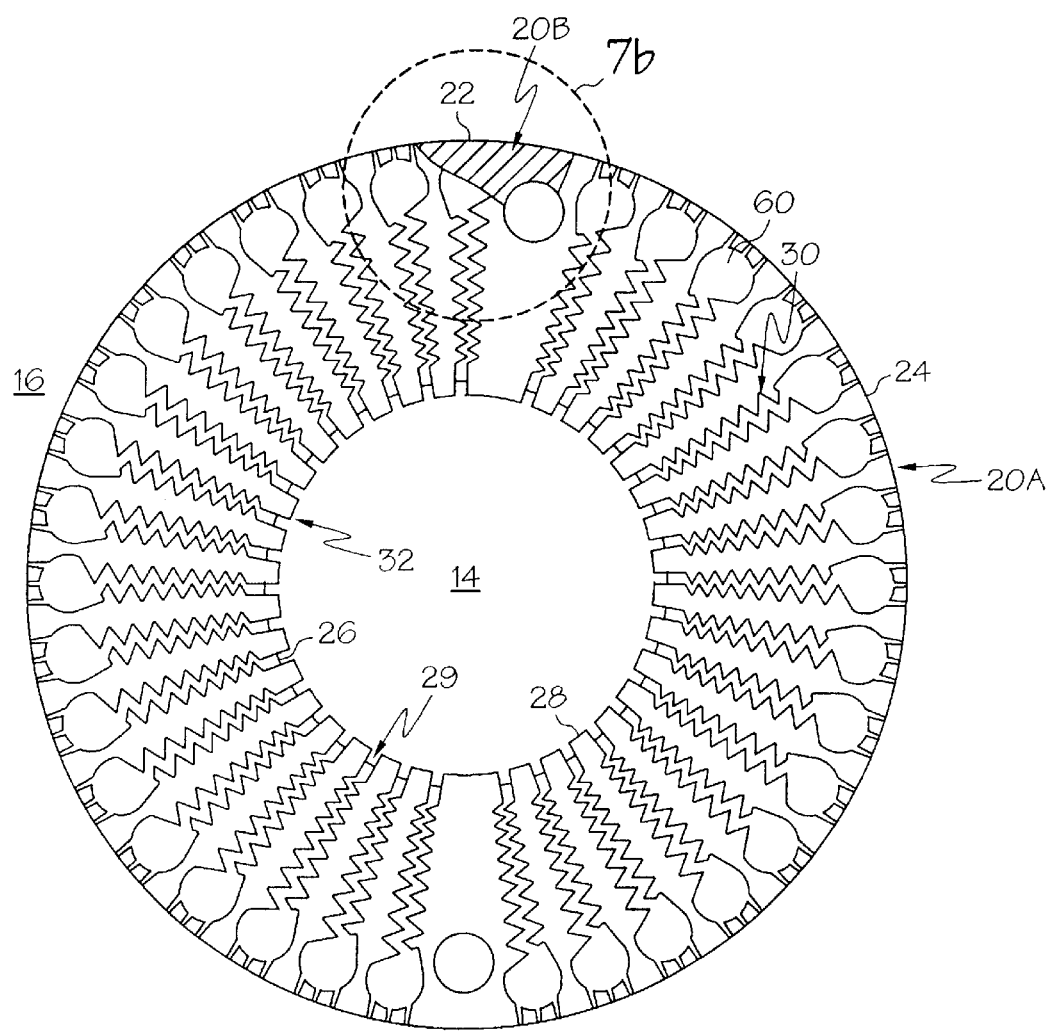
FIG. 7a illustrates a top view, partially broken away, of a flow disk stacked on a separation disk after removing an outer and an inner disposable flow disk portion in accordance with the process of the present invention for manufacturing a valve trim assembly.

FIGS. 2 and 5a illustrate the inner diameter 25 of the flow disk 20A and FIGS. 3, 5a and 7a illustrate the inner diameter 26 of the separation disk 20B. In accordance with the present invention, the flow disk 20A can further comprise an inner disposable flow disk portion 27, which inner disposable flow disk portion 27 is defined between a reduced flow disk inner diameter 28 and the inner diameter 25 of the flow disk 20A. The reduced flow disk inner diameter 28 is illustrated in FIGS. 2 and 5a by a dashed circumferential line, which transects a plurality of flow path inlets 29. The plurality of flow path inlets 29 are in fluid communication with the plurality to tortuous flow paths 30. The flow disk 20A is stacked on the separation disk 20B and, as further illustrated in FIG. 5a, the central axis of the flow disk 20A and the separation disk 20B are aligned along a common central axis. In this manner, each of the sets of disks that comprise the valve trim assembly 18 can define the plurality of tortuous flow paths 30, which extend in a radial direction from the central axis of the set of disks.

In accordance with the present invention, the process can further comprise removing the inner disposable flow disk portion 27, thereby creating the reduced flow disk inner diameter 28. The inner disposable flow disk portion 27 can be removed by an operation selected from machining, laser cutting, and combinations thereof and is removed at least as far as the terminal ends of the plurality of flow path inlets 29. Accordingly, the reduced flow disk inner diameter 28 will transect the flow path inlets 29, such that fluid arriving from the fluid inlet 14 is allowed to enter the flow path inlets 29, which are in fluid communication with the tortuous flow paths 30 (see FIG. 7a).

Prior to removing the inner disposable flow disk portion 27, the flow disk 20A can be secured to the separation disk 20B by an operation selected from brazing, gluing, clamping, and combinations thereof. Moreover, as illustrated in FIGS. 5a and 7a, both the flow disk inner diameter 25 and the reduced flow disk inner diameter 28 can be less than the separation disk inner diameter 26. The fluid inlet 14 is defined along the inner diameter of the disks. In this manner, the flow paths 30 associated with each set of disks can communicate with the fluid inlet 14 along a pressure equalization ring 32, which is formed by the flow disk inner diameter 25, or the reduced flow disk inner diameter 28 after removal of the inner disposable flow disk portion 27, in a volume immediately below the flow disk 20A, which is between a plug and the separation disk 20B. In addition, the reduced flow disk inner diameter 28 can be equal to the separation disk inner diameter 26. However, no equalization ring would be present.

Optionally, the flow disk inner diameter 25 can be greater than or equal to the separation disk inner diameter 26. In this optional embodiment (not shown), there is no inner disposable flow disk portion 27. If the flow disk inner diameter 25 is greater than the separation disk inner diameter 26, the equalization ring 32 is formed by the inner diameter 26 of the separation disk 20B. No equalization ring would exist if the inner diameters 25, 26 of the flow disk 20A and separation disk 20B are identical.

Whether the inner 27 or the outer 23 disposable flow disk portion is removed first is of no consequence. Moreover, once the flow disk 20A and separation disk 20B are secured together, the inner diameters 25, 26, or 28 can be machined to ensure that they are all concentric. This step can optionally be employed to lessen the noise of fluid flowing through the assembly 18.

Figure 5B:
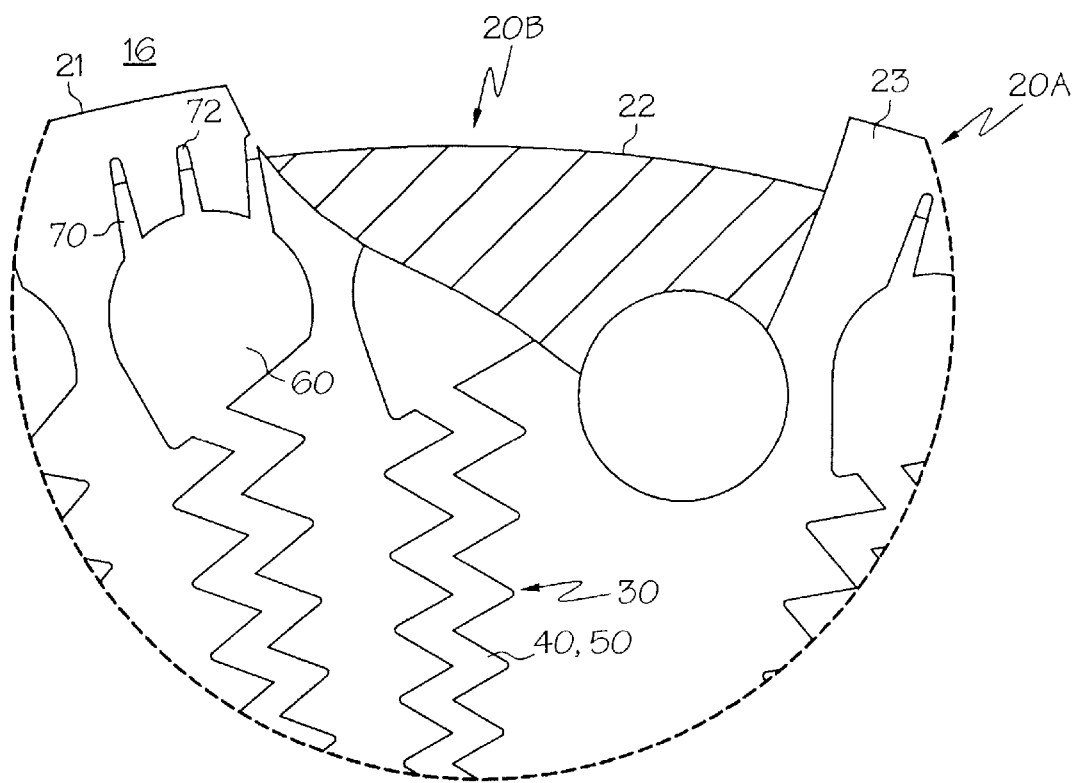
FIG. 5b illustrates a top partial view, partially broken away, of a flow disk stacked on a separation disk prior to removing an outer disposable flow disk portion in accordance with the process of the present invention for manufacturing a valve trim assembly.
Figures 6A, 6B:
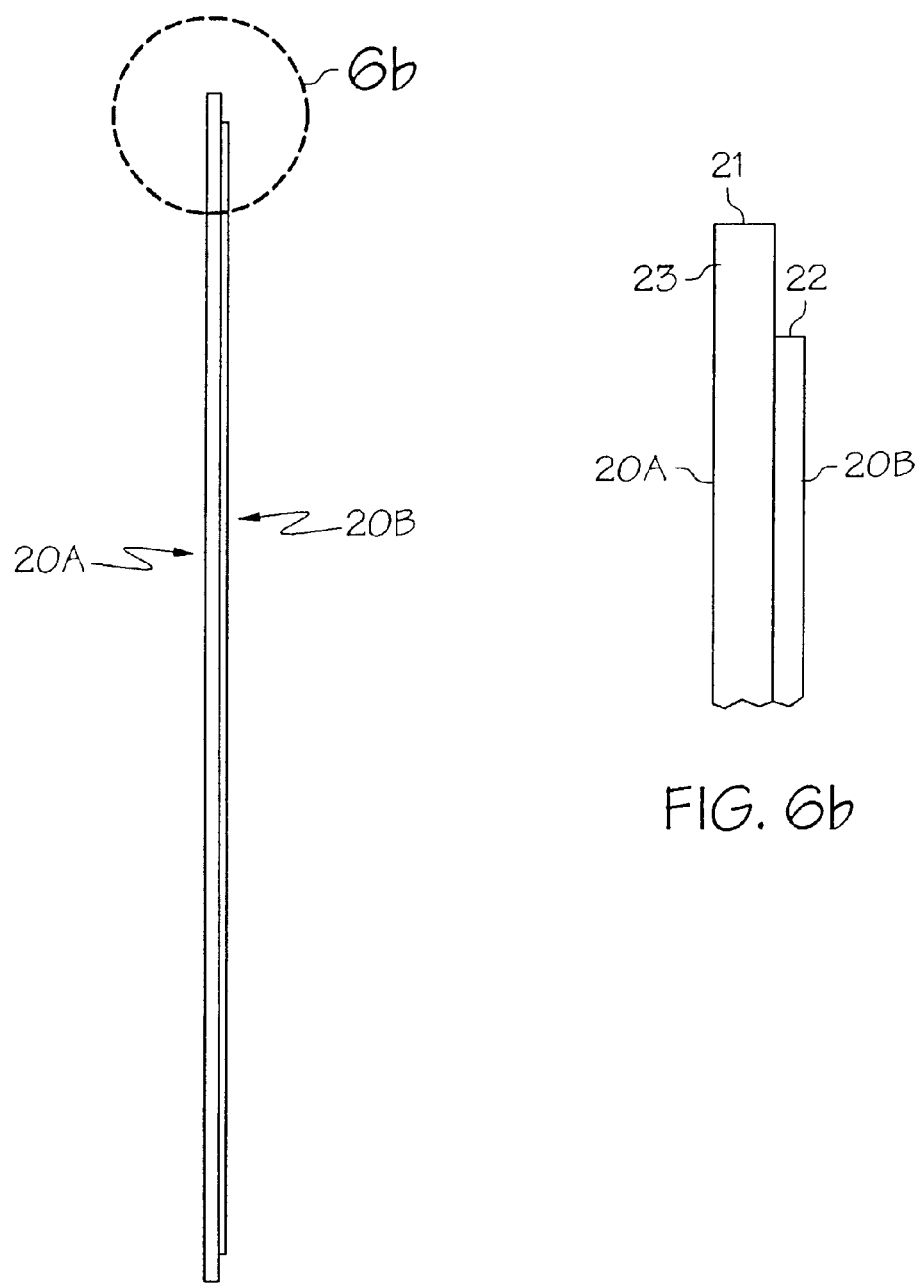
FIGS. 6a and 6b illustrate cross-sectional and partial cross-sectional views, respectively, of a flow disk stacked on a separation disk prior to removing an outer disposable flow disk portion in accordance with the process of the present invention for manufacturing a valve trim assembly.
Figure 7B:
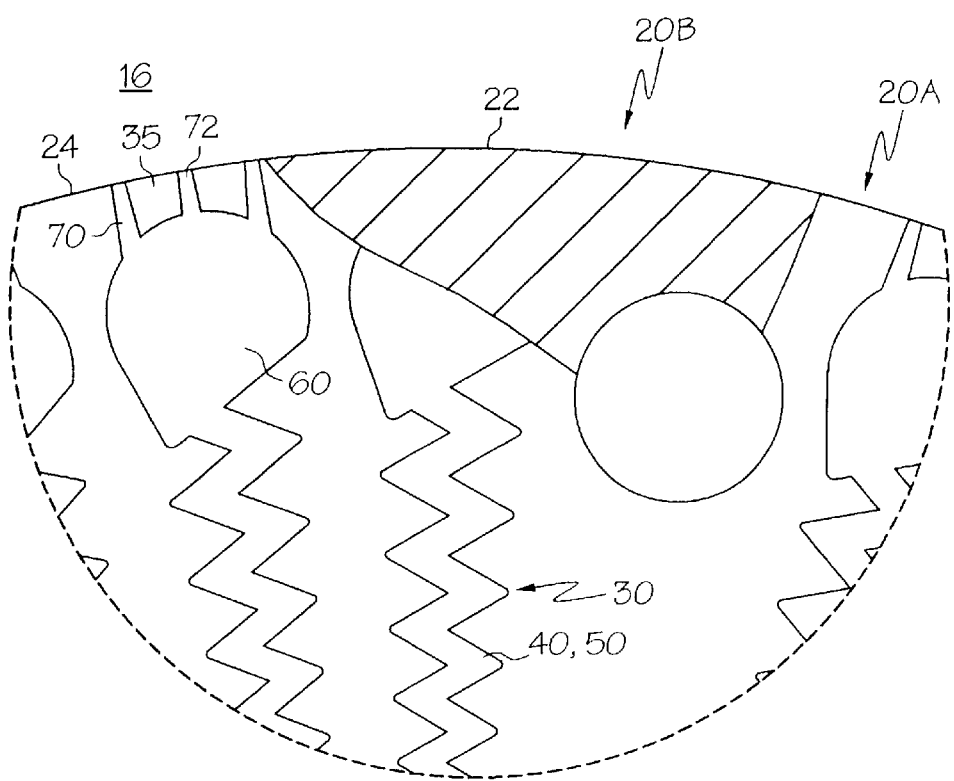
FIG. 7b illustrates a top partial view, partially broken away, of a flow disk stacked on a separation disk after removing an outer disposable flow disk portion in accordance with the process of the present invention for manufacturing a valve trim assembly.
Figures 8A, 8B:
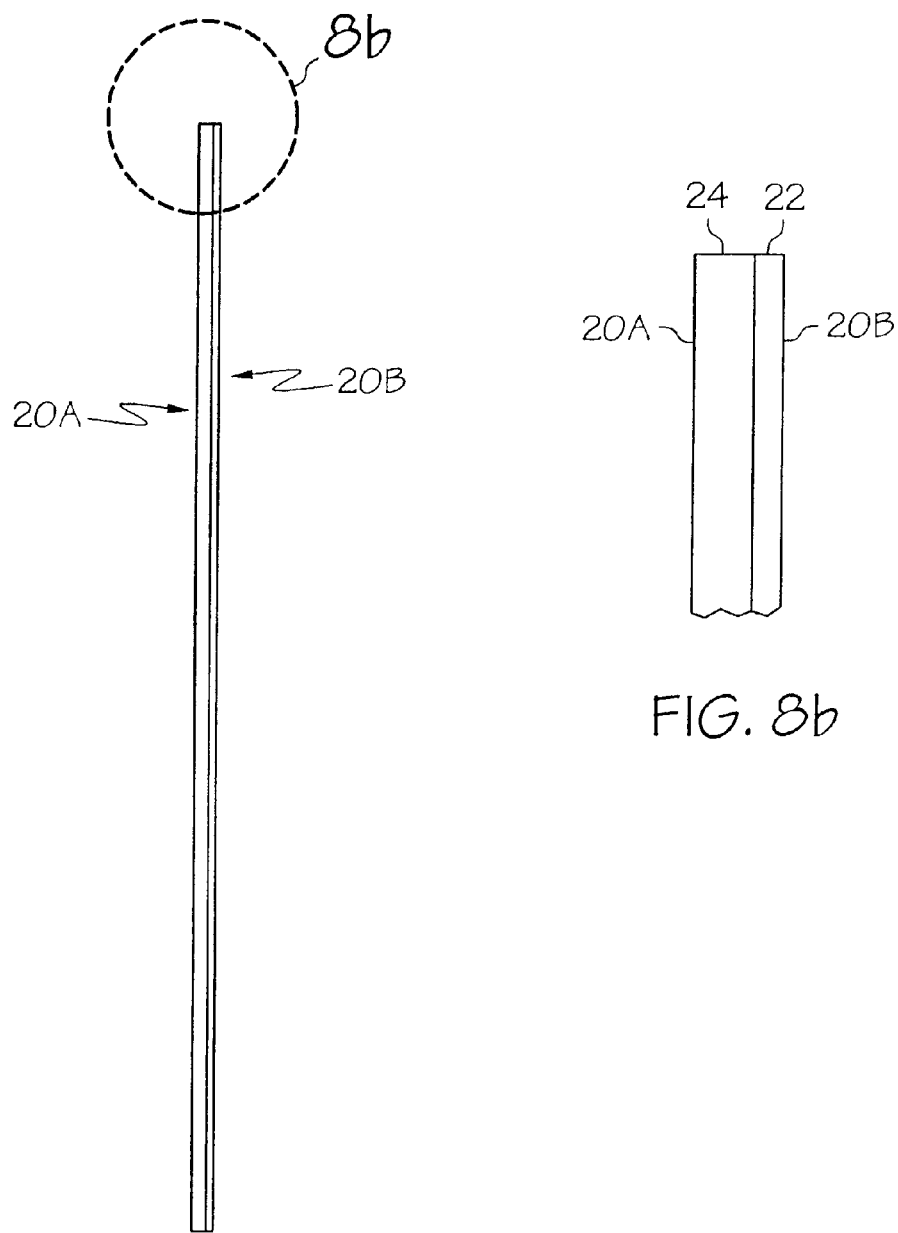
FIGS. 8a and 8b illustrate cross-sectional and partial cross-sectional views, respectively, of a flow disk stacked on a separation disk after removing an outer disposable flow disk portion in accordance with the process of the present invention for manufacturing a valve trim assembly.

The expansion/contraction mechanism 40 directs fluid flow into the acoustic chamber 60 and has a cross section that includes rapid increases and decreases in cross-sectional flow area. Specifically, as is illustrated in FIGS. 5b and 7b, the expansion/contraction mechanism 40 defines a plurality of V-shaped turns defining changes in flow direction of greater than 90 degrees. In this manner, fluid passing through the turns undergoes rapid expansion going into a turn and rapid contraction coming out of a turn. Although portions of the flow passage are bounded by the separation disk 20B or the top or bottom disk 20C, the turns themselves are defined substantially entirely by the flow disk 20A and lie in a plane defined by the disk 20A.

The expansion/contraction mechanism 40 as a whole defines an average cross sectional area that increases in the direction of the fluid outlet 16, i.e., the expansion/contraction mechanism 40 gets wider as it approaches the flow disk outer diameter 21. This expanding cross section defines the velocity control mechanism 50. Specifically, fluid velocity is reduced or held constant by defining a gradually increasing cross-sectional flow profile that has a relatively low cross-sectional flow area proximate the fluid inlet 14 and a relatively high cross-sectional flow area proximate the fluid outlet 16. In the illustrated embodiment, the velocity control mechanism 50 and the expansion/contraction mechanism 40 are defined by a common portion of the tortuous flow path 30. However, it is noted that the two mechanisms 40, 50 may be defined by independent portions of the flow path 30.

The acoustic chamber 60, which is positioned downstream of the expansion/contraction mechanism 40 and the velocity control mechanism 50, is configured to reduce, attenuate, eliminate, redirect, damp, or otherwise defeat acoustic disturbances generated in the expansion/contraction mechanism 40 and the velocity control mechanism 50. The acoustic chamber 60 may be configured to incorporate many specific features that defeat acoustic disturbances. For example, the acoustic chamber 60 may be configured to function as a resonator tuned to one or more of the frequencies corresponding to the frequency of sound generated within the flow passage. Preferably, the tuned frequency or frequencies are about 180 degrees out of phase with sound entering the chamber 60.

Figure 9:
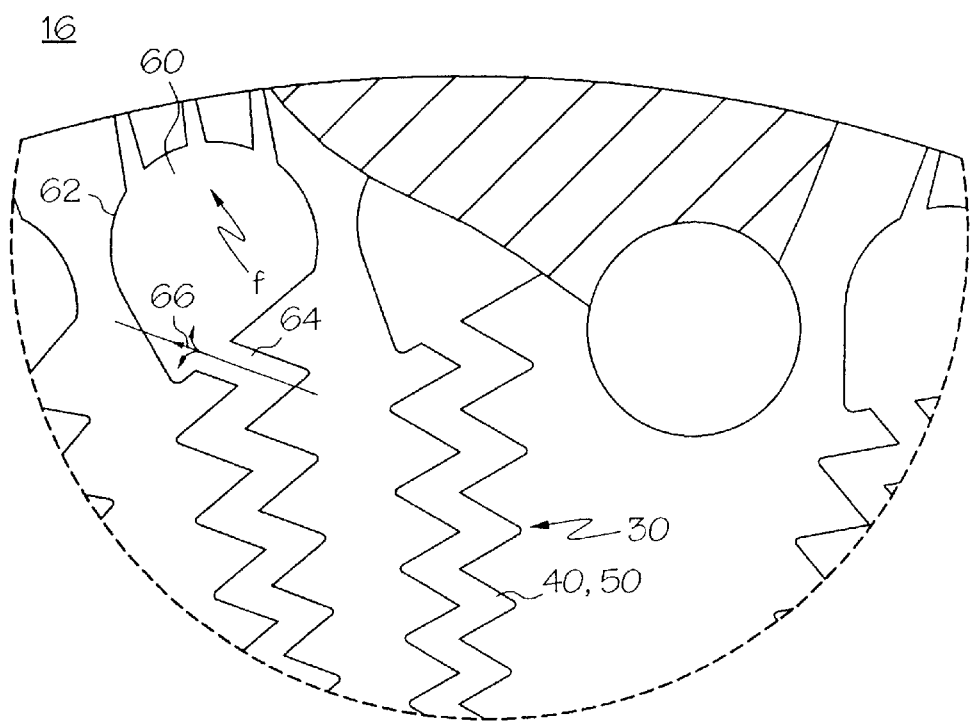
FIG. 9 illustrates a top partial view, partially broken away, of a tortuous flow path formed within a flow disk, the flow disk stacked on a separation disk in accordance with the process of the present invention for manufacturing a valve trim assembly.

It is also possible to defeat acoustic disturbances by minimizing creation of standing waves in the chamber 60. To this end, as is illustrated in FIG. 9, the chamber 60 is bound by non-parallel walls 62. In addition, the chamber inlet 64 is positioned along one of the chamber walls 62 such that fluid entering the chamber 60 through the chamber inlet 64 disperses in opposite directions along the chamber wall 62, as is indicated by the arrows in FIG. 9. The result is a diverging wavefront that is less subject to creation of standing waves.

The curved wall opposite the chamber inlet 64 is configured such that a focal point f of the curved wall is offset from a path 66 along which fluid enters the acoustic chamber 60 through the chamber inlet 64. In this manner, redirection of fluid back towards the chamber inlet 64 is minimized.

The plurality of outlet passages can be tapered to define the frequency shifting passages 70 and can be in fluid communication with a tortuous flow path 30 or an acoustic chamber 60. The outlet passages are configured to direct fluid flow from the flow path or acoustic chamber 60 to the fluid outlet 16 and increase the sonic frequency of acoustic disturbances associated with the directed fluid. Specifically, the cross sectional area and length of the frequency shifting passages 70 are such that any acoustic disturbances transmitted through or created in the passages 70 have significantly higher frequency than the acoustic disturbance associated with the remainder of the fluid flow control device 10. As is illustrated in FIGS. 7a and 7b, the frequency shifting passages 70 are in independent communication with the acoustic chamber 60 and extend from the reduced flow disk outer diameter 24 of the flow disk 20A over a portion of the acoustic chamber 60. In the illustrated embodiment, a set of three (3) frequency shifting passages 70 extend over each acoustic chamber 60, and do so to substantially equal extents.

As illustrated in further detail in FIG. 7b, the frequency shifting passages 70 taper to a reduced cross section at the fluid outlet 16. In this manner, the passages 70 limit pressure recovery at the fluid outlet 16. The taper of the passages 70 also serves to isolate the outlet stream of each passage 70 from adjacent passage outlet streams, reducing interference between the outlet streams.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

While the invention has been described by reference to certain embodiments, it should be understood that numerous changes could be made within the spirit and scope of the inventive concepts described. Accordingly, it is intended that the invention not be limited to the disclosed embodiments, but that it have the full scope permitted by the language of the following claims. In addition, it is contemplated that a variety of passage and chamber designs may fall within the scope of the present invention without direct description of such designs herein.

What is claimed is:

1. A process for manufacturing a valve trim assembly comprising:
   providing a flow disk having an outer diameter, an inner diameter, and an outer disposable flow disk portion;
   providing a separation disk having an outer diameter and an inner diameter, wherein said flow disk outer diameter is greater than said separation disk outer diameter;
   stacking said flow disk on said separation disk; and
   removing said outer disposable flow disk portion creating a reduced flow disk outer diameter.

2. The process of claim 1 wherein said reduced flow disk outer diameter is at least equal to said separation disk outer diameter.

3. The process of claim 1 further comprising securing said flow disk to said separation disk prior to removing said outer disposable flow disk portion.

4. The process of claim 3 further comprising securing said flow disk to said separation disk by an operation selected from brazing, gluing, clamping, and combinations thereof.

5. The process of claim 1 further comprising removing said outer disposable flow disk portion by an operation selected from machining, laser cutting, and combinations thereof.

6. The process of claim 1 wherein said flow disk is provided with a plurality of outlet passages, wherein each outlet passage has a terminal end, and wherein said terminal end does not extend to said flow disk outer diameter.

7. The process of claim 6 wherein said outlet passages are tapered.

8. The process of claim 7 wherein said tapered outlet passages comprise frequency shifting passages.

9. The process of claim 6 wherein said outlet passages are in fluid communication with a tortuous flow path.

10. The process of claim 6 wherein said outlet passages are in fluid communication with an acoustic chamber.

11. The process of claim 6 wherein said outer disposable flow disk portion is removed at least as far as said terminal end of said outlet passages creating a reduced flow disk outer diameter that transects said outlet passages, thereby creating a flow disk island between adjacent outlet passages.

12. The process of claim 11 further comprising securing said flow disk to said separation disk such that said flow disk island is secured to said separation disk.

13. The process of claim 1 further comprising stacking an additional disk adjacent to said flow disk to form said valve trim assembly, wherein said additional disk is selected from a separation disk, a top disk, and a bottom disk.

14. The process of claim 13 further comprising securing said additional disk to said flow disk by an operation selected from brazing, gluing, clamping, and combinations thereof.

15. The process of claim 1 wherein said flow disk further comprises an inner disposable flow disk portion.

16. The process of claim 15 further comprising removing said inner disposable flow disk portion creating a reduced flow disk inner diameter.

17. The process of claim 16 wherein said reduced flow disk inner diameter is less than or equal to said separation disk inner diameter.

18. The process of claim 16 further comprising securing said flow disk to said separation disk prior to removing said inner disposable flow disk portion.

19. The process of claim 18 further comprising securing said flow disk to said separation disk by an operation selected from brazing, gluing, clamping, and combinations thereof.

20. The process of claim 16 further comprising removing said inner disposable flow disk portion by an operation selected from machining, laser cutting, and combinations thereof.

21. The process of claim 1 wherein said flow disk inner diameter is greater than or equal to said separation disk inner diameter.

22. A process for manufacturing a valve trim assembly comprising:
providing a flow disk having an outer diameter, an inner diameter, an outer disposable flow disk portion, and a plurality of outlet passages, wherein each outlet passage has a terminal end, and wherein said terminal end does not extend to said flow disk outer diameter;
providing a separation disk having an outer diameter and an inner diameter, wherein said flow disk outer diameter is greater than said separation disk outer diameter, and wherein said flow disk inner diameter is greater than or equal to said separation disk inner diameter;
stacking said flow disk on said separation disk;
securing said flow disk to said separation disk;
removing said outer disposable flow disk portion at least as far as said terminal end of said outlet passages creating a reduced flow disk outer diameter that transects said outlet passages, thereby creating a flow disk island between adjacent outlet passages; and
stacking an additional disk adjacent to said flow disk to form said valve trim assembly, wherein said additional disk is selected from a separation disk, a top disk, and a bottom disk.

23. A process for manufacturing a valve trim assembly comprising:
providing a flow disk having an outer diameter, an inner diameter, an outer disposable flow disk portion, an inner disposable flow disk portion, and a plurality of outlet passages, wherein each outlet passage has a terminal end, and wherein said terminal end does not extend to said flow disk outer diameter;
providing a separation disk having an outer diameter and an inner diameter, wherein said flow disk outer diameter is greater than said separation disk outer diameter, and wherein said flow disk inner diameter is less than said separation disk inner diameter;
stacking said flow disk on said separation disk;
securing said flow disk to said separation disk;
removing said outer disposable flow disk portion at least as far as said terminal end of said outlet passages creating a reduced flow disk outer diameter that transects said outlet passages, thereby creating a flow disk island between adjacent outlet passages;
removing said inner disposable flow disk portion creating a reduced flow disk inner diameter that is less than or equal to said separation disk inner diameter; and
stacking an additional disk adjacent to said flow disk to form said valve trim assembly, wherein said additional disk is selected from a separation disk, a top disk, and a bottom disk.

24. A process for manufacturing a valve trim assembly comprising:
providing a flow disk having an outer diameter, an inner diameter, an outer disposable flow disk portion, and a plurality of outlet passages,
wherein each outlet passage has a terminal end,
wherein said terminal end does not extend to said flow disk outer diameter, and
wherein said outlet passages are in fluid communication with an acoustic chamber;
providing a separation disk having an outer diameter and an inner diameter, wherein said flow disk outer diameter is greater than said separation disk outer diameter, and wherein said flow disk inner diameter is greater than or equal to said separation disk inner diameter;
stacking said flow disk on said separation disk;
securing said flow disk to said separation disk;
removing said outer disposable flow disk portion at least as far as said terminal end of said outlet passages creating a reduced flow disk outer diameter that transects said outlet passages, thereby creating a flow disk island between adjacent outlet passages; and
stacking an additional disk adjacent to said flow disk to form said valve trim assembly, wherein said additional disk is selected from a separation disk, a top disk, and a bottom disk.

25. A process for manufacturing a valve trim assembly comprising:
providing a flow disk having an outer diameter, an inner diameter, an outer disposable flow disk portion, an inner disposable flow disk portion, and a plurality of outlet passages,
wherein each outlet passage has a terminal end,
wherein said terminal end does not extend to said flow disk outer diameter, and
wherein said outlet passages are in fluid communication with an acoustic chamber;
providing a separation disk having an outer diameter and an inner diameter, wherein said flow disk outer diameter is greater than said separation disk outer diameter, and wherein said flow disk inner diameter is less than said separation disk inner diameter;
stacking said flow disk on said separation disk;
securing said flow disk to said separation disk;
removing said outer disposable flow disk portion at least as far as said terminal end of said outlet passages creating a reduced flow disk outer diameter that transects said outlet passages, thereby creating a flow disk island between adjacent outlet passages;
removing said inner disposable flow disk portion creating a reduced flow disk inner diameter that is less than or equal to said separation disk inner diameter; and
stacking an additional disk adjacent to said flow disk to form said valve trim assembly, wherein said additional disk is selected from a separation disk, a top disk, and a bottom disk.

* * * * *